US011319224B2

(12) United States Patent
Mtombeni et al.

(10) Patent No.: US 11,319,224 B2
(45) Date of Patent: May 3, 2022

(54) TREATMENT OF WATER

(71) Applicant: PHILLERT TRUST, Pretoria (ZA)

(72) Inventors: Tabani Mtombeni, Pretoria (ZA); Johannes Philippus Maree, Pretoria (ZA)

(73) Assignee: PHILLERT TRUST, Gauteng (ZA)

( * ) Notice: Subject to any disclaimer, the term of this patent is extended or adjusted under 35 U.S.C. 154(b) by 139 days.

(21) Appl. No.: 16/099,009

(22) PCT Filed: May 5, 2016

(86) PCT No.: PCT/IB2016/052567
§ 371 (c)(1),
(2) Date: Nov. 5, 2018

(87) PCT Pub. No.: WO2017/191494
PCT Pub. Date: Nov. 9, 2017

(65) Prior Publication Data
US 2019/0194043 A1    Jun. 27, 2019

(51) Int. Cl.
*C02F 1/52*    (2006.01)
*C02F 1/02*    (2006.01)
(Continued)

(52) U.S. Cl.
CPC .......... *C02F 1/5245* (2013.01); *B01D 9/0004* (2013.01); *B01D 9/0059* (2013.01);
(Continued)

(58) Field of Classification Search
CPC .......... C02F 1/5245; C02F 1/02; C02F 1/441; C02F 1/444; C02F 1/66; C02F 1/004;
(Continued)

(56) References Cited

U.S. PATENT DOCUMENTS

| 2007/0045189 A1 | 3/2007 | Lichtner et al. | |
| 2015/0210562 A1* | 7/2015 | Dette | C02F 1/22 |
| | | | 159/13.1 |
| 2016/0115061 A1* | 4/2016 | Ukai | C02F 9/00 |
| | | | 210/696 |

FOREIGN PATENT DOCUMENTS

WO    2014/023437 A1    2/2014

OTHER PUBLICATIONS

International Search Report PCT/IB2016/052567 dated Jul. 7, 2016.
(Continued)

*Primary Examiner* — Akash K Varma
(74) *Attorney, Agent, or Firm* — Pillsbury Winthrop Shaw Pittman, LLP

(57) ABSTRACT

A process to treat water includes adding a salt-forming base to the water thereby producing saline water, or thereby forming a salt in the water which is different from a salt that the water started out with, if the water started out as saline. The saline water is treated, at a temperature T1 which is above the saturation temperature of the saline water, in a first membrane separation stage to provide clean water and a first brine, the salinity of the first brine being higher than the salinity of the saline water. The first brine is cooled to a temperature T2 to precipitate some of the salt from the first brine and the precipitated salt is separated from the first brine producing a second brine, the temperature T2 being below the temperature T1 but above the freezing temperature of the first brine. The second brine is treated at a temperature T3 above the saturation temperature of the second brine in a second membrane separation stage to provide clean water and a third brine. The salt-forming base, the temperature T1 and the temperature T2 are selected so that the salt which is formed in the saline water has a
(Continued)

solubility in water at the temperature T1 which is at least 1.5 times the solubility of the salt in water at the temperature T2.

13 Claims, 6 Drawing Sheets

(51) Int. Cl.
*C02F 1/44* (2006.01)
*C02F 1/66* (2006.01)
*C02F 9/00* (2006.01)
*B01D 65/08* (2006.01)
*B01D 61/04* (2006.01)
*B01D 9/00* (2006.01)
*B01D 61/58* (2006.01)
*C02F 103/10* (2006.01)
*C02F 1/00* (2006.01)
*B01D 61/14* (2006.01)
*B01D 61/02* (2006.01)
*C02F 101/10* (2006.01)

(52) U.S. Cl.
CPC ............. *B01D 61/04* (2013.01); *B01D 61/58* (2013.01); *B01D 65/08* (2013.01); *C02F 1/02* (2013.01); *C02F 1/441* (2013.01); *C02F 1/444* (2013.01); *C02F 1/66* (2013.01); *C02F 9/00* (2013.01); *B01D 61/025* (2013.01); *B01D 61/142* (2013.01); *B01D 2311/103* (2013.01); *B01D 2311/106* (2013.01); *B01D 2311/12* (2013.01); *B01D 2311/18* (2013.01); *B01D 2311/25* (2013.01); *B01D 2311/2642* (2013.01); *C02F 1/004* (2013.01); *C02F 2001/007* (2013.01); *C02F 2001/5218* (2013.01); *C02F 2101/101* (2013.01); *C02F 2103/10* (2013.01); *C02F 2301/08* (2013.01)

(58) Field of Classification Search
CPC ...... C02F 1/52; C02F 1/44; C02F 9/00; C02F 2001/007; C02F 2001/5218; C02F 2101/101; C02F 2103/10; C02F 2301/08; C02F 1/00; B01D 9/0004; B01D 9/0059; B01D 61/04; B01D 61/58; B01D 61/025; B01D 61/142; B01D 65/08; B01D 2311/103; B01D 2311/106; B01D 2311/12; B01D 2311/18; B01D 2311/25; B01D 2311/2642; B01D 9/00; B01D 61/02; B01D 61/42; B01D 61/022
USPC .......................................................... 210/737
See application file for complete search history.

(56) References Cited

OTHER PUBLICATIONS

Written Opinion of the International Searching Authority PCT/IB/2016/052567 dated Jul. 7, 2016.
International Preliminary Report on Patentability PCT/IB2016/052567 dated Jul. 23, 2018.

* cited by examiner

TREATMENT OF WATER

CROSS-REFERENCE TO RELATED APPLICATIONS

This Application is the U.S. National Stage of PCT/IB2016/052567, filed May 5, 2016, the contents of which is incorporated herein by reference in entirety.

THIS INVENTION relates to treatment of water. In particular, the invention relates to a process to treat water, and to a process to remove a salt from saline water Industrial aqueous effluents need to be treated before being discharged into public streams. Often such industrial effluent, e.g. acid mine drainage, has a low pH. Limestone or lime is normally used for neutralization of acidic streams. In the case of sulphate rich water, gypsum sludge is however produced when lime or limestone is used, which need to be stockpiled. Gypsum sludge also creates a problem in a membrane separation process as the gypsum blinds the separation membrane, whether a reverse osmosis membrane or an ultrafiltration membrane.

Once neutralised, it is often a further requirement that the neutralised water be desalinated before the water is released into public waterways or streams. Desalination typically employs processes such as reverse osmosis, electro-dialysis, ultrafiltration and ion-exchange. The brine or regenerant streams produced in these processes are considered as environmental hazards and require treatment with processes such as evaporation ponds, distillation, direct contact membrane distillation, vacuum membrane distillation and membrane distillation. These methods are however either environmentally unacceptable or costly. Freeze desalination is an alternative technology that has been suggested for treatment of brines, but produce ice contaminated with a salt or salts.

It is also often necessary, in addition to increasing the pH of aqueous waste streams, to remove metals from such streams prior to their release. Metals may also need to be removed from water being treated using a membrane separation stage, as metal hydroxides may scale or blind the membranes of such a membrane separation stage.

According to a first aspect of the invention, there is provided a process to treat water, the process including adding a salt-forming base to the water thereby producing saline water, or thereby forming a salt in the water which is different from a salt that the water started out with, if the water started out as saline;

treating the saline water, at a temperature $T_1$ which is above the saturation temperature of the saline water, in a first membrane separation stage to provide clean water and a first brine, the salinity of the first brine being higher than the salinity of the saline water;

cooling the first brine to a temperature $T_2$ to precipitate some of the salt from the first brine and separating the precipitated salt from the first brine producing a second brine, the temperature $T_2$ being below the temperature $T_1$ but above the freezing temperature of the first brine; and treating the second brine at a temperature $T_3$ above the saturation temperature of the second brine in a second membrane separation stage to provide clean water and a third brine, wherein the salt-forming base, said temperature $T_1$ and said temperature $T_2$ are selected so that the salt which is formed in the saline water has a solubility in water at said temperature $T_1$ which is at least 1.5 times the solubility of said salt in water at said temperature $T_2$.

The water being treated may be acidic.

The process may include heating the second brine to a temperature above the saturation temperature of the second brine, e.g. to said temperature $T_3$.

The treatment of the water by the addition of said base may be to increase the pH of the water simply for the sake of increasing the pH and/or, if Ca and sulphate are present, to remove Ca as a non-sulphate salt to avoid the possibility of gypsum fouling of membranes of a membrane separation stage employed to desalinate the water and/or if a metal or metals is/are present, to remove the metal or metals as e.g. a metal hydroxide by raising the pH. Thus, adding a salt-forming base to the water may have an effect selected from the group of effects consisting of increasing the pH of the water simply for the sake of increasing the pH, removing Ca as a non-sulphate salt to avoid the possibility of gypsum fouling of membranes of a membrane separation stage employed to desalinate the water if Ca and sulphate are present in the water, removing a metal or metals if a metal or metals is/are present in the water, and two or more of these effects.

As will be appreciated, with low or zero Ca and metals such as Fe, Zn, Mn, and the like being present in water containing sulphate, Na, K and Mg are acceptable as sulphate salts in the water, as the sulphate salts of these cations have a high solubility and will not scale the membranes of a membrane separation stage, unlike Ca.

The base, said temperature $T_1$ and said temperature $T_2$ may be selected so that the salt which is formed in the saline water has a solubility in water at said temperature $T_1$ which is at least 2 times, preferably at least 2.5 times, more preferably at least 3 times, even more preferably at least 3.5 times, e.g. at least 4 times the solubility of said salt in water at said temperature $T_2$.

The water to be treated may include $H_2SO_4$ and/or $HNO_3$.

When $HNO_3$ and/or $H_2SO_4$ is present in the water being treated the salt-forming base may be selected from the group consisting of $Na_2CO_3$, $NH_4OH$, $NaOH$, $NaHCO_3$, $NH_3$, $KOH$, $KHCO_3$, $K_2CO_3$, $Mg(OH)_2$ and $MgCO_3$. In the case of $HNO_3$ but not $H_2SO_4$ being present in the water to be treated also $Ca(OH)_2$ and $CaCO_3$ can be used as base but then any $SO_4$ needs to be removed during pre-treatment by using for instance $BaCO_3$ to precipitate $SO_4$ as $BaSO_4$.

In one embodiment of the invention, the salt-forming base is $Na_2CO_3$ or $NaHCO_3$ or a mixture of these two bases. The use of $Na_2CO_3$ and/or $NaHCO_3$ as base advantageously avoids the formation of gypsum in the event that the water is sulphate-rich. For mine water which often contains some Ca, $Na_2CO_3$ as base can thus advantageously be used. Thus, whenever Ca and/or other metals are present that form carbonates that are poorly soluble in water, membrane fouling can be prevented by dosing $Na_2CO_3$.

In another embodiment of the invention, the salt-forming base is $NH_4OH$ or $NH_3$ or a mixture of these two bases. By using $NH_3$ or $NH_4OH$ for neutralization of water rich in $H_2SO_4$ or $HNO_3$ the salt in the water will mainly be $(NH_4)_2SO_4$ or $NH_4NO_3$. Both $(NH_4)_2SO_4$ and $NH_4NO_3$ can easily be removed to a significant extent from brine using cooling. One application of the process in accordance with the invention is thus the treatment of aqueous effluent rich in $NH_4NO_3$. For example, $NH_4NO_3$-rich aqueous effluent is formed in chrome processing. $HNO_3$ solution containing metals such as Cr is neutralized with $NH_4OH$. The formed $NH_4NO_3$-rich effluent can then be treated with the process of the invention.

In a further embodiment of the invention, the salt-forming base is NaOH, KOH, KHCO$_3$, K$_2$CO$_3$, K$_2$CO$_3$, Mg(OH)$_2$ or MgCO$_3$ or mixtures of two or more of these bases. MgCO$_3$ can for example be used for removal of the corresponding SO$_4^{2-}$ or NO$_3^-$ salts during cooling of the brine, i.e. at cold temperatures.

The water to be treated may include metals, e.g. Fe(II), Fe(III), Al(III), Cu, Ni, Co, Mn, Mg, and/or Ca. Adding a salt-forming base to the water may increase the pH of the water and may induce precipitation of one or more metals. The process may further include removing the precipitated metals from the saline water prior to the saline water being treated in the first membrane separation stage.

In one embodiment of the invention, adding a salt-forming base to the water thus increases the pH of the water and induces precipitation of one or more metals, e.g. producing a metals-rich sludge. The precipitated metals, e.g. in the form of a metals-rich sludge, are removed from the saline water prior to the saline water being treated in the first membrane separation stage. Removal of the metals prevents scaling or blinding of membranes of a membrane separation stage with metal hydroxides, oxides or carbonates.

Advantageously, NaHCO$_3$ and/or Na$_2$CO$_3$ can be used as salt-forming base to induce precipitation of one or more metals, with the metal or metals in the water being replaced by Na. When the water to be treated includes H$_2$SO$_4$ and/or HNO$_3$ and NaHCO$_3$ and/or Na$_2$CO$_3$ is used as base, the salt in the water will typically be mainly Na$_2$SO4 and/or NaNO$_3$. Na$_2$SO4 is formed as a result of the following reaction:

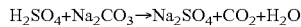
$$H_2SO_4 + Na_2CO_3 \rightarrow Na_2SO_4 + CO_2 + H_2O$$

The process may then include removing CO$_2$ gas, which can if desired be recovered as a by-product.

Both Na$_2$SO4 and/or NaNO$_3$ can easily be removed to a significant extent from brine using cooling.

The salt-forming base may be added step-wise to the water to increase the pH of the water step-wise. This would allow for separate recovery of various metals from the resultant saline water, typically as metal hydroxides or metal oxides, or even as carbonates. For example, Fe(OH)$_3$ can be recovered from the saline water as pigment, using for example NaCO$_3$ or NaHCO$_3$ as salt-forming base. If precipitated at pH<3.6 from the saline water, the Fe(OH)$_3$ pigment has a yellow colour. As the pH of the saline water is increased above 3.6, the colour of the Fe(OH)$_3$ pigment changes to brown. NaHCO$_3$ will not raise the pH of the water above 7.5, whereas Na$_2$CO$_3$ can be used to raise the pH to above 12. Fe(III) precipitates at pH 3, Fe(II) at pH 8, Zn at pH 7 to pH 8, Mn at pH 9.2 and Mg is completely removed from water when the pH is raised to 11.2.

Fe(OH)$_3$ can be formed as follows:

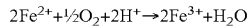
$$2Fe^{2+} + \tfrac{1}{2}O_2 + 2H^+ \rightarrow 2Fe^{3+} + H_2O$$

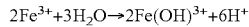
$$2Fe^{3+} + 3H_2O \rightarrow 2Fe(OH)^{3+} + 6H^+$$

The cooling of brine cannot remove chlorides as the solubility of NaCl is not strongly dependent on temperature. The process may thus include subjecting brine from a membrane separation stage to an electrolytic treatment step to convert NaCl and water to Cl$_2$, NaOH and H$_2$ in accordance with the following reaction:

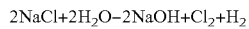
$$2NaCl + 2H_2O - 2NaOH + Cl_2 + H_2$$

Also fluorides can be removed from the brine as F$_2$ gas by electrolysis.

According to a second aspect of the invention, there is provided a process to remove a salt from saline water, the process including treating the saline water, at a temperature T$_1$ which is above the saturation temperature of said salt in the saline water, in a first membrane separation stage to provide clean water and a first brine, the salinity of the first brine being higher than the salinity of the saline water;

cooling the first brine to a temperature T$_2$ to precipitate some of the salt from the first brine and separating the precipitated salt from the first brine producing a second brine, the temperature T$_2$ being below the temperature T$_1$ but above the freezing temperature of the first brine; and treating the second brine at a temperature T$_3$ above the saturation temperature of the second brine in a second membrane separation stage to provide clean water and a third brine, wherein said temperature T$_1$ and said temperature T$_2$ are selected so that said salt in the saline water has a solubility in water at said temperature T$_1$ which is at least 1.5 times the solubility of said salt in water at said temperature T$_2$.

The process according to the first or second aspect of the invention may include heating the second brine to a temperature above the saturation temperature of the second brine, e.g. to said temperature T$_3$.

The process according to the first or second aspect of the invention may include heating the saline water to said temperature T$_1$.

The process according to the first or second aspect of the invention may include recycling a portion of the second brine to the first membrane separation stage to increase the concentration of salt in the saline water being treated in the first membrane separation stage. The portion of the second brine being recycled to the first membrane separation stage may be second brine which has been heated to a temperature above the saturation temperature of the second brine.

The process according to the first or second aspect of the invention may include cooling the third brine to a temperature T$_4$ to precipitate some of the salt from the third brine and separating the precipitated salt from the third brine producing a fourth brine, the temperature T$_4$ being below the temperature T$_3$ but above the freezing temperature of the third brine;

heating the fourth brine to a temperature above the saturation temperature of the fourth brine; and treating the fourth brine at a temperature T$_5$ above the saturation temperature of the fourth brine in a third membrane separation stage to provide clean water and a fifth brine.

According to a third aspect of the invention, there is provided a process to remove a salt from saline water, the process including treating the saline water, at a temperature T$_1$ which is above the saturation temperature of said salt in the saline water, in a membrane separation stage to provide clean water and a first brine, the salinity of the first brine being higher than the salinity of the saline water;

cooling the first brine to a temperature T$_2$ to precipitate some of the salt from the first brine and separating the precipitated salt from the first brine producing a second brine, the temperature T$_2$ being below the temperature T$_1$ but above the freezing temperature of the first brine; and recycling the second brine to the membrane separation stage to increase the salinity of the saline water which is being treated in the membrane separation stage, wherein said temperature $T_1$ and said temperature $T_2$ are selected so that said salt in the saline water has a solubility in water at said temperature $T_1$ which is at least 1.5 times the solubility of said salt in water at said temperature $T_2$.

The process according to the third aspect of the invention may include withdrawing a purge stream, e.g. a purge portion of the second brine. The purge stream may be subjected to evaporation, or to freeze desalination or crystallisation, or to vacuum distillation.

The process according to the third aspect of the invention may include heating the second brine, or at least the second brine being recycled to the membrane separation stage.

Said temperature $T_1$ and said temperature $T_2$ in the process according to the second or third aspect of the invention may be selected so that said salt in the saline water has a solubility in water at said temperature $T_1$ which is at least 2 times, preferably at least 2.5 times, more preferably at least 3 times, even more preferably at least 3.5 times, e.g. at least 4 times the solubility of said salt in water at said temperature $T_2$.

In this specification, the term "clean water" is intended to refer to water which has been desalinated at least in part. The clean water may however still contain some salt and/or other impurities, e.g. metals, and the term "clean water" is thus not intended to refer to water of a particular quality or which is necessarily potable.

The water being treated may include sulphate. The process may include first using $BaCO_3$ as a pre-treatment for removal of sulphate as precipitated barium sulphate. Barium sulphate is insoluble in water.

Once the sulphate has been removed, $Ca(OH)_2$ or $CaCO_3$ as salt-forming base can be used to neutralise $HNO_3$ in the water being treated.

The temperature $T_1$ may be in the range of from about 20° C. to about 40° C., preferably from about 30° C. to about 40° C., more preferably from about 35° C. to about 40° C., e.g. about 40° C.

The temperature $T_3$ may be in the range of from about 20° C. to about 40° C., preferably from about 30° C. to about 40° C., more preferably from about 35° C. to about 40° C., e.g. about 40° C. The temperature $T_3$ may thus be the same temperature as the temperature $T_1$.

The temperature $T_2$ may be in the range of from about 0° C. to about 20° C., preferably from about 0° C. to about 15° C., more preferably from about 0° C. to about 10° C., e.g. about 0° C.

The temperature $T_4$ may be in the range of from about 0° C. to about 20° C., preferably from about 0° C. to about 15° C., more preferably from about 0° C. to about 10° C., e.g. about 0° C. The temperature $T_4$ may thus be the same temperature as the temperature $T_2$.

Caution should be taken to ensure that the temperatures $T_1$ and $T_3$ are sufficiently high to ensure that the saline water and the second brine remain below saturation level to prevent scaling of membranes of the membrane separation stage treating the saline water or the second brine. A similar consideration should be applied to the temperature $T_5$ if a third membrane separation stage is employed.

The process may include oxidising a metal or metals in the water prior to the saline water being treated in the membrane separation stage or the first membrane separation stage, as the case may be. Oxidation of the metal or metals may be by means of air, oxygen, ozone or hydrogen peroxide. Advantageously, a metal in the water or in the saline water can thus be oxidised to a state where the metal is less soluble in water, e.g. from $Fe^{2+}$ to $Fe^{3+}$ or from $Mn^{2+}$ to $Mn^{4+}$, to precipitate respectively as $Fe(OH)_3$ and $MnO_2$, prior to the saline water being treated in the first membrane separation stage.

Cooling a brine, e.g. the first brine or the third brine, may include circulating the brine through a fluidisation reactor to form agglomerated particles, e.g. pellets of the precipitating salt.

The process may include transferring heat from brine being cooled to brine being heated. For example, heat from the first brine being cooled may be transferred to the second brine being heated, and/or heat from the third brine being cooled may be transferred to the fourth brine being heated. A heat pump may be used to transfer heat.

The membrane separation stage or stages may be a reverse osmosis stage or an ultrafiltration stage. Advantageously, an ultrafiltration stage operates at a lower pressure (e.g. about 5 bar) than a reverse osmosis stage (e.g. about 30 bar), but monovalent ions can only be partially removed from water by means of an ultrafiltration stage. An ultrafiltration stage does however effectively remove divalent and trivalent ions from water. If the water to be treated includes a monovalent ion that requires removal, e.g. $Na^+$ and $Cl^-$ from dissolved NaCl, at least some of the $Na^+$ and $Cl^-$ will pass through an ultrafiltration membrane.

Thus, in one embodiment of the invention, at least one membrane separation stage employs ultrafiltration membranes, the process including treating the clean water from such a membrane separation stage in a reverse osmosis stage to remove divalent ions from the clean water.

The process may thus include treating the clean water from a membrane separation stage, e.g. the membrane separation stage of the process according to the third aspect of the invention or the first and/or second and/or third membrane separation stage, where such membrane separation stage employs ultrafiltration membranes, in a reverse osmosis stage to remove divalent ions, e.g. $Na^+$ and $Cl^-$, from the clean water.

The membrane separation stage or the first membrane separation stage may include two or more membrane separation sub-stages employed in series, with brine from a first sub-stage being passed to a second sub-stage, and, if required, brine from a second sub-stage being passed to a third sub-stage, and so forth, to ensure that the brine from the last sub-stage produced by the membrane separation stage or the first membrane separation stage has a salinity which is above the saturation point at said temperature $T_2$, but below said temperature $T_1$. Typically, the clean water from all sub-stages of a membrane separation stage is combined to provide the clean water for that membrane separation stage. Thus, for example, if the brine from a membrane separation stage consists mainly of water and $Na_2SO_4$, the membrane separation stage should include sufficient sub-stages, e.g. two or three sub-stages, taking into account the salinity of the water being fed to the membrane separation stage, so that the brine produced by the membrane separation stage has a $Na_2SO_4$ concentration of at least about 200 g/L, when $T_1$ is say of the order of 25-40° C. and $T_2$ is about 0° C.

Brine from a final membrane separation stage, e.g. a second or a third membrane separation stage, may be subjected to evaporation, or to freeze desalination or crystallisation, or to vacuum distillation.

The precipitated salt may be processed into raw materials or recovered as saleable by-products. For example, in the case where the precipitated salt is $Na_2SO_4$, the $Na_2SO_4$ can be converted to $Na_2CO_3$ with the Solvay process.

In the case where the precipitated salt is of $NH_4NO_3$, $NH_3$ in the form of $NH_4OH$ can be recovered by adding lime, as shown by the following formulas:

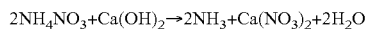

$$2NH_4NO_3 + Ca(OH)_2 \rightarrow 2NH_3 + Ca(NO_3)_2 + 2H_2O$$

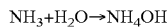

$$NH_3 + H_2O \rightarrow NH_4OH$$

$NH_4OH$ is used for neutralization of $HNO_3$ or $H_2SO_4$ and $Ca(NO_3)_2$ can be profitably sold to the explosive and fertilizer industries.

The invention will now be described, by way of example, with reference to the accompanying diagrammatic drawings in which FIG. 1 shows one embodiment of a process in accordance with the invention to treat water;

Figure 1:
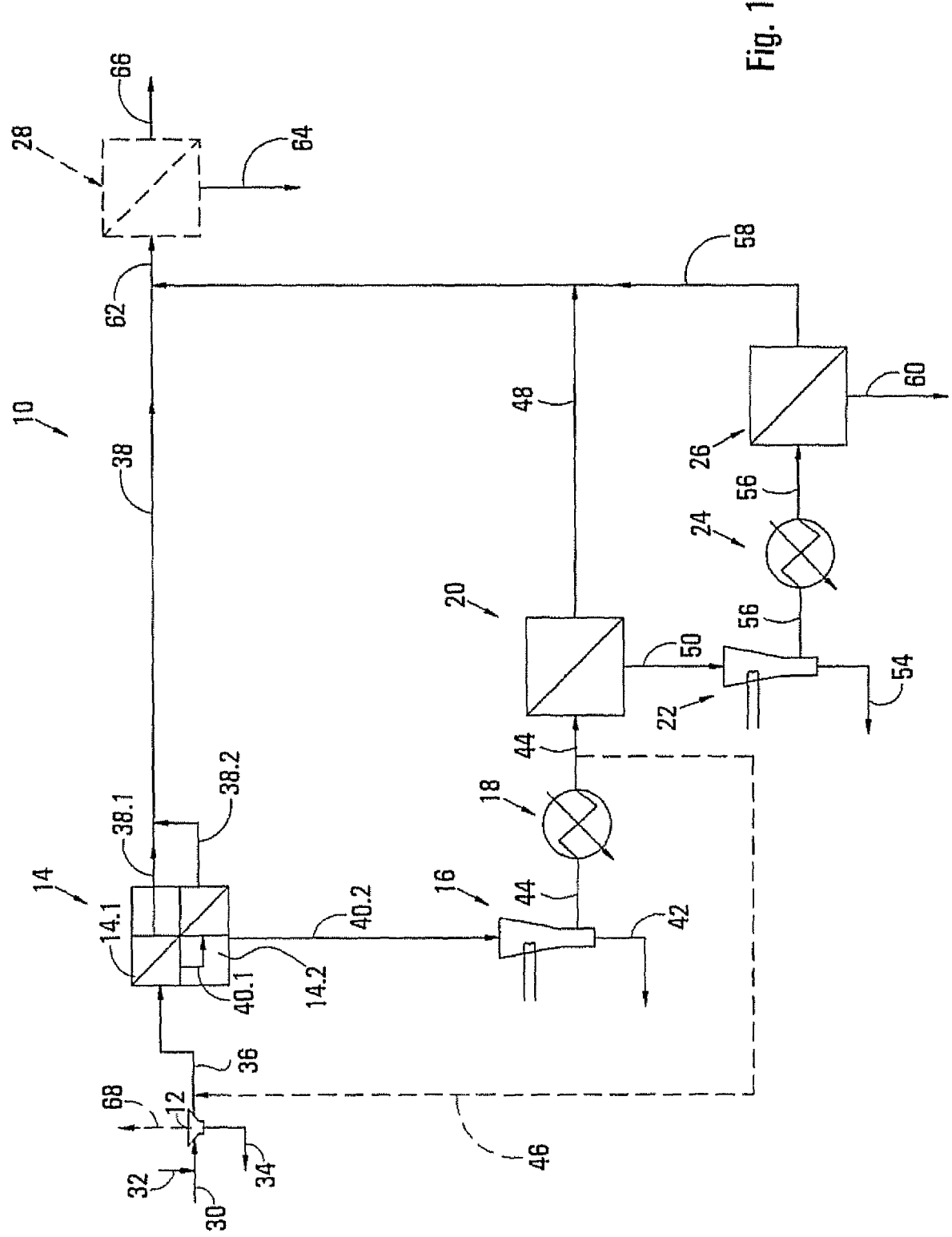

Referring to FIG. 1 of the drawings, reference numeral 10 generally indicates a process in accordance with the invention to treat water. In the process 10, the water is treated to increase the pH of the water, to remove metals from the water and to desalinate the water.

The process 10 includes, broadly, a metals sludge gravity settler 12, a first membrane separation stage 14, a cooled salt precipitator 16, a heater 18, a second membrane separation stage 20, a cooled salt precipitator 22, a heater 24, a third membrane separation stage 26 and an optional reverse osmosis stage 28.

The membrane separation stage 14 is a multi-stage membrane separation stages, including two sub-stages 14.1 and 14.2. As will be appreciated, if desired or necessary, the membrane separation stage 14 may include additional sub-stages.

An aqueous, acidic effluent line 30 is joined by a base line 32 and feeds into the metals sludge gravity settler 12. The metals sludge gravity settler 12 is provided with a metals sludge line 34 at a bottom withdrawal point thereof, and a saline line 36 which runs to the first membrane separation stage 14.

Each membrane separation sub-stage 14.1, 14.2 is provided respectively with a clean water line 38.1, 38.2. The clean water lines 38.1, 38.2 are joined to form a clean water line 38.

Each membrane separation sub-stage 14.1, 14.2 is also provided with a respective brine line 40.1, 40.2.

The brine line 40.2 from the membrane separation sub-stage 14.2 runs to the cooled salt precipitator 16, which is provided with a salt withdrawal line 42 and a brine line 44. The brine line 44 passes through the heater 18 and runs to the second membrane separation stage 20. An optional recycle line 46 splits off from the brine line 44, between the heater 18 and the second membrane separation stage 20 and returns to the saline line 36.

The second membrane separation stage 20 and the third membrane separation stage 26 are provided with clean water lines 48 and 58 and brine lines 50 and 60 respectively.

The brine line 50 from the second membrane separation stage 20 runs into the cooled salt precipitator 22, which is provided with a salt withdrawal line 54 and a brine line 56. The brine line 56 passes through the heater 24 and runs into the third membrane separation stage 26.

The clean water lines 38, 48 and 58 are joined to form a clean water line 62.

In the process 10 shown in FIG. 1, the clean water line 62 runs to the optional reverse osmosis separation stage 28, which is provided with a brine line 64 and a clean water line 66.

The membrane separation stages 14, 20 and 26 are ultrafiltration stages operating at a pressure of about 5 bar each. As such, the membrane separation stages 14, 20 and 26 are unable effectively to remove monovalent ions, such as $Na^+$ and $Cl^-$ from aqueous streams. The optional reverse osmosis stage 28 is however operating at a pressure of about 30 bar and can effectively remove monovalent ions such as $Na^+$ and $Cl^-$ from aqueous streams.

The aqueous acidic effluent line 30 is used to feed an aqueous effluent which includes $H_2SO_4$ and dissolved Fe(III) to the metals sludge settler 12. The aqueous effluent in the line 30 is dosed with $Na_2CO_3$ as base to neutralise the $H_2SO_4$ and to precipitate any Ca as $CaCO3$. If Ca is present but not removed $CaSO_4.2H_2O$ (gypsum) will result in membrane fouling (gypsum scale). Dosing with $Na_2CO_3$ as base thus increases the pH of the aqueous effluent and produces an aqueous effluent rich in $Na_2SO_4$, whilst avoiding the formation of gypsum. The sodium added to the aqueous effluent replaces the Fe(III) ions in solution, causing $Fe(OH)_3$ to precipitate out in the form of a gypsum-free metals-rich sludge in the metals sludge gravity settler 12. The metals sludge containing the $Fe(OH)_3$ is removed from the metals sludge settler 12 by means of the metals sludge line 34.

Other metals that can be replaced by $Na^+$ ions in water, resulting in their precipitation as a sludge, include Fe(II), Al(III), Cu, Ni, Co, Mn, Mg, and/or Ca. Although not shown in FIG. 1, the process 10 may include oxidising a metal or metals in the aqueous effluent before the saline water is treated in the first membrane separation stage 14. Oxidation of the metal or metals may be by means of air, oxygen, ozone or hydrogen peroxide. Advantageously, a metal in the aqueous effluent can thus be oxidised to a state where the metal is less soluble in water, e.g. from $Fe^{2+}$ to $Fe^{3+}$ or from $Mn^{2+}$ to $Mn^{4+}$, to precipitate respectively as $Fe(OH)_3$ and $MnO_2$, prior to the saline water being treated in the first membrane separation stage 14.

Addition of the $NaCO_3$ should be carefully controlled to obtain the desired pH for the aqueous effluent. This is also of great importance for the recovery of $Fe(OH)_3$ as a pigment. If precipitated at a pH of 3.6, the $Fe(OH)_3$ pigment has a yellow colour. As the pH gets higher, the colour of the $Fe(OH)_3$ pigment changes to brown. This implies that the extent to which the aqueous acidic effluent in the aqueous acidic effluent line 30 is neutralised by the addition of the $Na_2CO_3$ base from the base line 32 is determined by the colour of the $Fe(OH)_3$ pigment it is desired to recover. Naturally, if desired or necessary, further base, e.g. $Na_2CO_3$ can be added to the aqueous effluent in the saline line 36, after removal of metals, to increase the pH, if the pH at which the metals are removed is not as high as is preferred for clean water.

The neutralisation of the sulphuric acid in the aqueous acidic effluent by the $Na_2CO_3$ base is represented by the following formula:

$$H_2SO_4 + Na_2CO_3 \rightarrow Na_2SO_4 + CO_2 + H_2O.$$

If desired, $CO_2$ can be recovered as a by-product, as indicated in FIG. 1 by an optional line 68 for the metals sludge gravity settler 12. As will be appreciated, in the event $CO_2$ is to be recovered, the metals sludge gravity settler must be a closed vessel.

An aqueous saline stream which includes mostly $Na_2SO_4$ as a dissolved salt is withdrawn as an overflow by means of the saline line 36 from the metals sludge gravity settler 12. In the embodiment of the process of the invention shown in FIG. 1 of the drawings, the aqueous stream in the saline line 36 also includes some NaCl.

For illustrative purposes, it is assumed that the aqueous stream in the saline line 36 flows at a rate of 10,000 l/h and has a $Na_2SO_4$ concentration of 2 g/l. It is also assumed that each sub-stage of the first membrane separation stage 14 has a water recovery of 90% and a $Na_2SO_4$ salt rejection of 100%, and that the second and third membrane separation stages 20 and 26 each has a water recovery of 80% and a $Na_2SO_4$ salt rejection of 100%.

The aqueous effluent, at a temperature $T_1$ which is ambient temperature, is thus passed through the first membrane separation sub-stage 14.1, at a pressure of about 5 bar, to produce 9,000 l/h of clean water withdrawn by means of the clean water line 38.1 and 1,000 l/h of brine which is passed to the second membrane separation sub-stage 14.2 by means of the brine line 40.1. The $Na_2SO_4$ concentration in the brine in the brine line 40.1 is now 20 g/l. The membrane separation sub-stage 14.2 separates the 1,000 l/h brine into 900 l/h of clean water which is withdrawn by means of the clean water line 38.2, producing 100 litres of brine with a $Na_2SO_4$ concentration of about 200 g/l. At an ambient temperature $T_1$ of say about 25° C., the aqueous effluent and the brine in the first membrane separation stage 14 are at all times above the saturation temperature for $Na_2SO_4$, as can be seen from FIG. 2.

Figure 2:
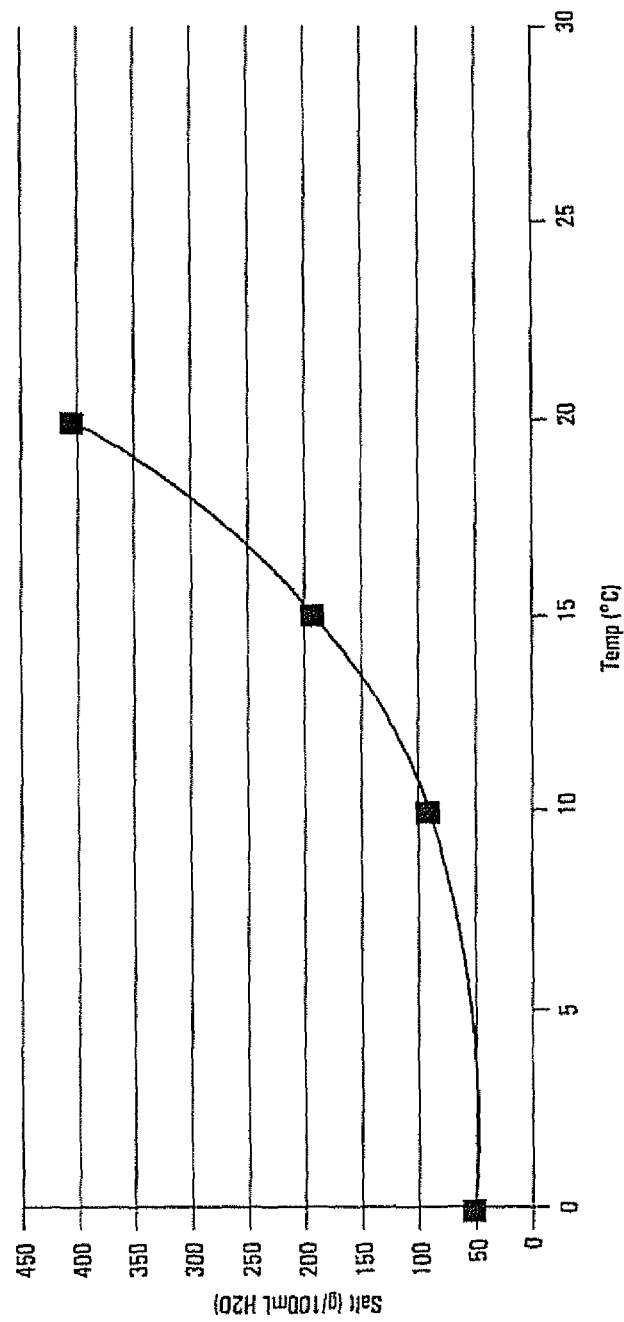
FIG. 2 shows a graph of the solubility of $Na_2SO_4$ in water as a function of water temperature.

The brine from the second membrane separation sub-stage 14.2 is passed by means of the brine line 40.2 to the cooled salt precipitator 16 where the brine is cooled to a temperature $T_2$ of about 0° C. This is still above the freezing temperature of the brine from the second membrane separation sub-stage 14.2. With reference to FIG. 2 of the drawings, it is clear that, at about 0° C., $Na_2SO_4$ will precipitate from the brine, providing a brine with a saturated concentration of about 50 g/l of $Na_2SO_4$. The precipitated $Na_2SO_4$ (roughly 15 kg/h) is withdrawn by means of the salt withdrawal line 42 and the brine from the cooled salt precipitator 16 is withdrawn by means of the brine line 44 and passed to the heater 18.

Figure 6:
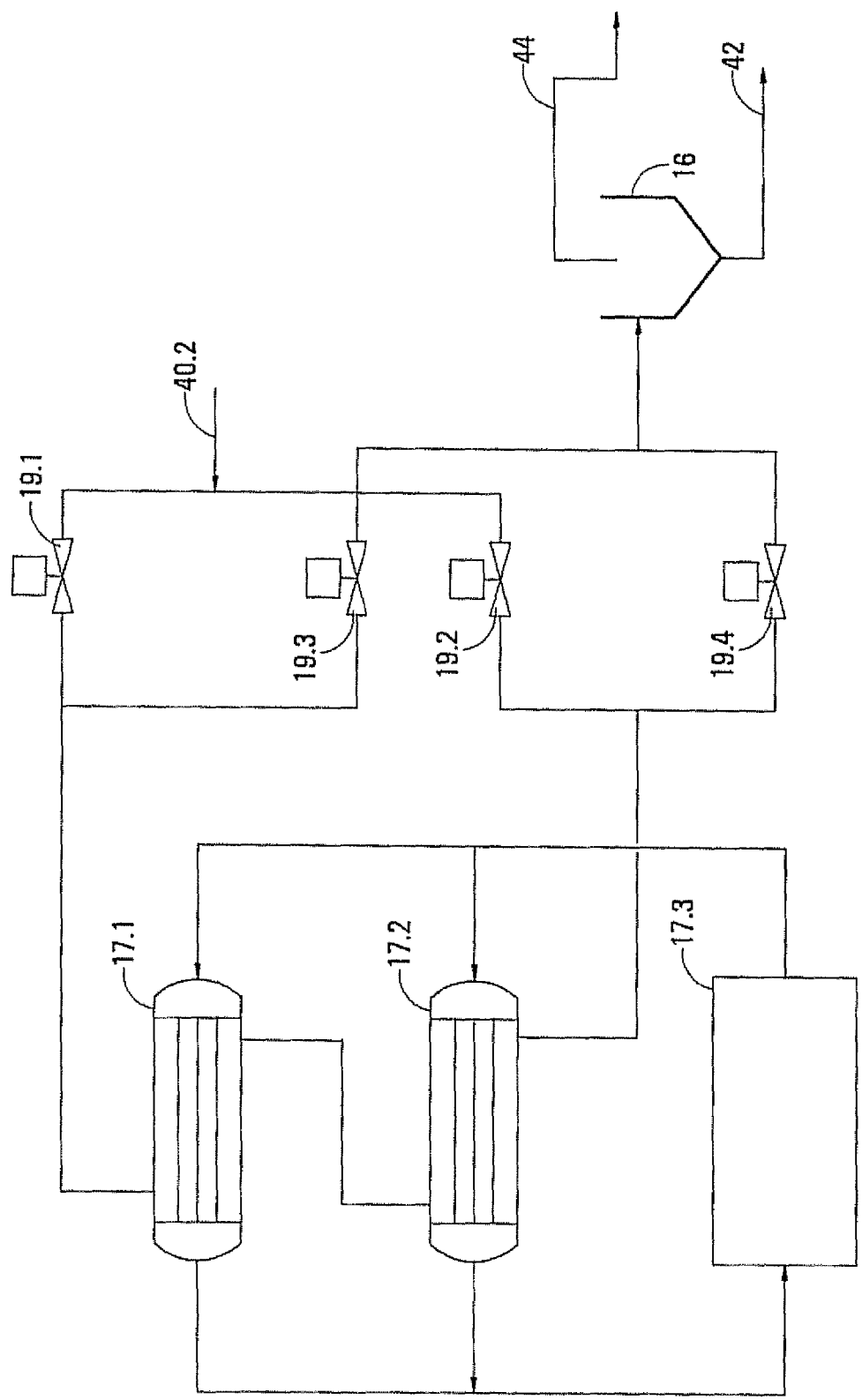
FIG. 6 shows an embodiment of a cooled salt precipitator employing external heat exchangers using periodical reverse flow of brine to counteract salt and/or ice formation in the heat exchangers.

Typically, the cooled salt precipitator 16 is a fluidised reactor in which the brine is circulated using an external pump (not shown), passing upwardly through the reactor, thereby promoting agglomeration of precipitating salt. The brine in the cooled salt precipitator 16 is cooled for example by using cooling coils inside the cooled salt precipitator 16, as shown in FIG. 1, or by using one or more heat exchangers in the flow of brine, external of the cooled salt precipitator 16, as shown in FIG. 6.

When the brine in the brine line 40.2 includes chlorides, the chlorides will end up, in the form of NaCl, in for example the brine line 44. NaCl levels will also build up as a result of the recycle of brine in recycle line 46. The cooling of brine cannot remove chlorides as the solubility of NaCl is not strongly dependent on temperature. A similar problem exists for fluorides. Brine from a membrane separation stage, e.g. the first membrane separation stage 14, and/or the second membrane separation stage 20 can be passed through an electrolytic treatment step (not shown) to convert NaCl and water to $Cl_2$, NaOH and $H_2$ in accordance with the following reaction:

$$2NaCl + 2H_2O \rightarrow 2NaOH + Cl_2 + H_2$$

For electrolysis of brine, a mercury cell process can for example be used.

Fluorides can also be removed from brine, as $F_2$ gas, using electrolysis.

About 100 l/h of brine with a concentration of about 50 g/l of $Na_2SO_4$ is heated in the heater 18 to a temperature $T_3$ above about 25° C., say about 40° C. thereby to desaturate the brine with respect to the dissolved $Na_2SO_4$ and passed to the second membrane separation stage 20. Typically, a heat pump (not shown) is used to transfer heat from the cooled salt precipitator 16 to the heater 18 to improve the energy efficiency of the process 10.

If desired, heated brine from the heater 18 can be recirculated to the first membrane separation stage 14, as indicated by the optional recycle line 46. The circulation of brine by means of the recirculation line 46 will increase the salinity of the effluent being treated in the first membrane separation stage 14, which in turn may eliminate a membrane separation stage or membrane separation stages from the process 10.

The second membrane separation stage 20 operates at said temperature $T_3$ and produces about 80 l/h of clean water withdrawn along line 48 and about 20 l/h of brine with a $Na_2SO_4$ concentration of about 250 g/l. Brine from the second membrane separation stage 20 is cooled in the cooled salt precipitator 22 to a temperature $T_4$ of about 0° C. As a result, roughly 4 kg/h $Na_2SO_4$ is precipitated which is removed by means of the salt withdrawal line 54. About 20 l/h of brine with a $Na_2SO_4$ concentration of about 50 g/l is produced which is withdrawn by means of the brine line 56. The heater 24 is used to heat the brine in the brine line 56 to a temperature $T_5$ above about 25° C., say about 40° C. thereby to desaturate the brine with respect to the dissolved $Na_2SO_4$, before the brine is passed to the third membrane separation stage 26.

About 20 l/h of brine with a $Na_2SO_4$ concentration of 50 g/l is thus treated in the third membrane separation stage 26 to produce 16 l/h of clean water withdrawn along line 58 and 4 l/h of brine with a concentration of about 250 g/l $Na_2SO_4$.

The clean water from the first membrane separation stage 14, the second membrane separation stage 20 and the third membrane separation stage 26 are transferred respectively by means of the clean water lines 38, 48 and 58, and combined in the clean water line 62. As $Na^+$ and $Cl^-$ ions will not be effectively removed in the ultrafiltration membrane separation stages 14, 20 and 26, the clean water in the clean water line 62 will still include $Na^+$ and $Cl^-$ ions. In order to remove the $Na^+$ and $Cl^-$ ions, the clean water in the clean water line 62 is passed to the optional reverse osmosis stage 28, operating at a pressure of about 30 bar. The optional reverse osmosis stage 28 produces clean water, which is withdrawn by means of the clean water line 66, which is substantially free of $Na^+$ and $Cl^-$ ions, and a brine which is withdrawn by means of the brine line 64. The brine in the brine line 64 will include dissolved $Na^+$ and $Cl^-$ ions.

The brine withdrawn from the third membrane separation stage 26 by means of the brine line 60 may be subjected to evaporation, or to freeze desalination or freeze crystallisation, or to vacuum distillation.

Advantageously, the process 10, as illustrated, avoids fouling of reverse osmosis or ultrafiltration membranes by gypsum, removes salt from brine as a solid by cooling without the need to go below freezing point where ice is contaminated with salt and avoids the cost associated with freezing of water.

Figure 3:
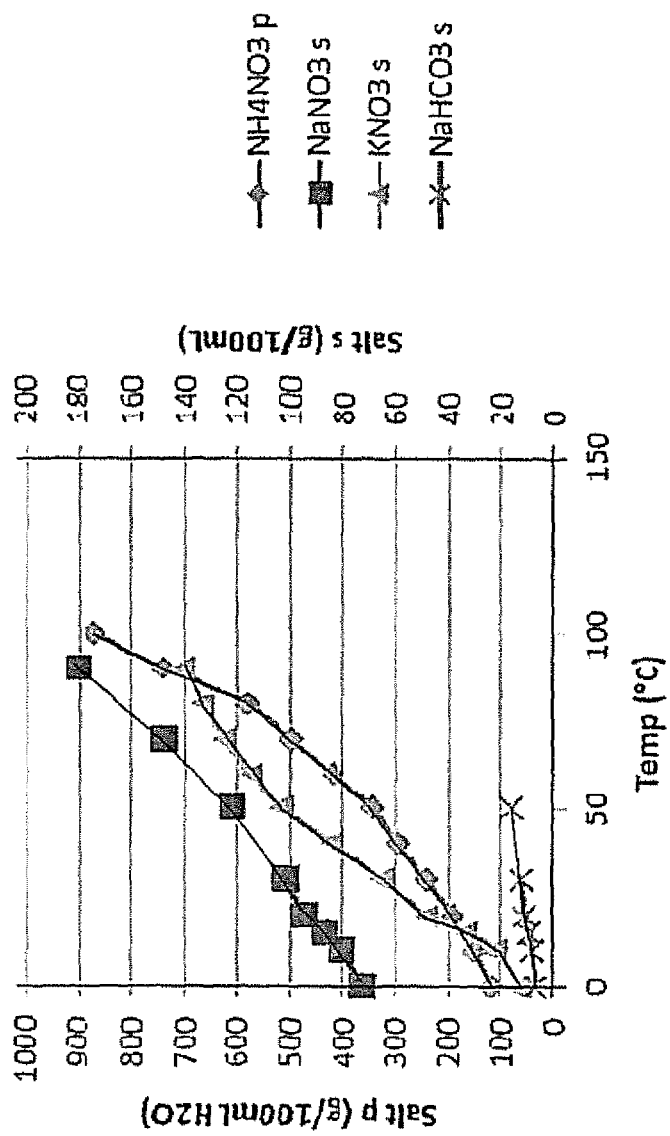
FIG. 3 shows graphs of the solubility of $NH_4NO_3$, $NaNO_3$, $KNO_3$ and $NaHCO_3$ in water as a function of water temperature.
Figure 4:
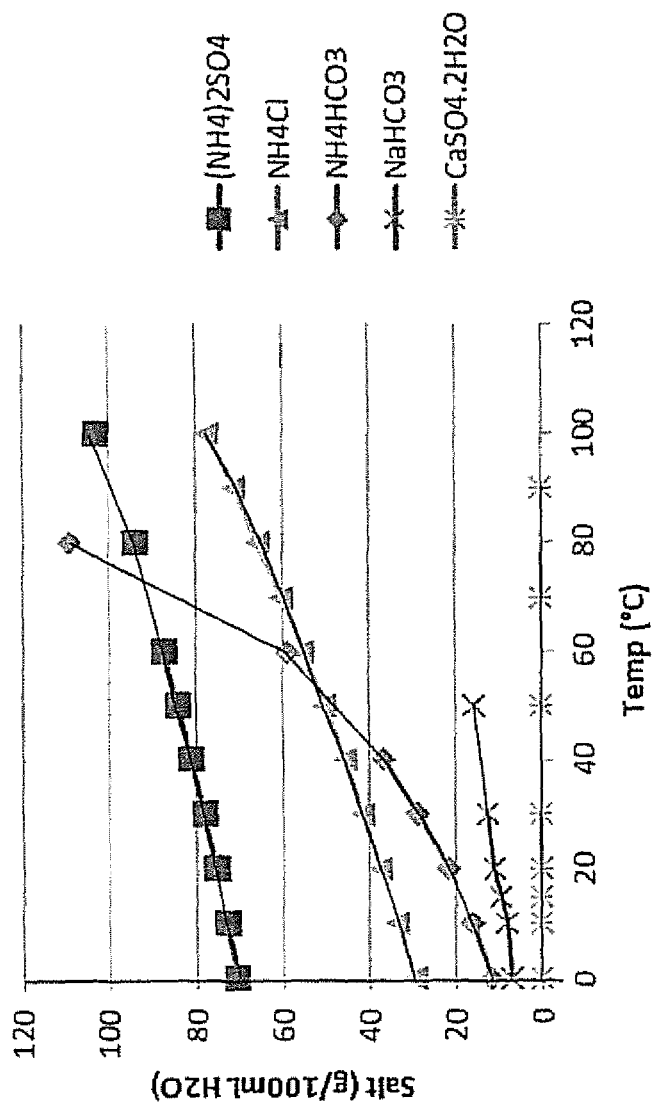
FIG. 4 shows graphs of the solubility of $(NH_4)_2SO_4$, $NH_4Cl$, $NH_4HCO_3$, $NaHCO_3$ and $CaSO_4.2H_2O$ in water as a function of water temperature.

The process 10 can also be used for treating water which contains $HNO_3$. Using $NaHCO_3$ and/or $Na_2CO_3$ as base, $NaNO_3$ will be the salt formed in the neutralised aqueous effluent. Referring to FIG. 3, it is clear that the solubility of $NaNO_3$ in water is also strongly temperature dependent. The process 10, as illustrated, is less suited to removal of salts such as $NaHCO_3$ and $CaSO_4.2H_2O$ as can be seen from FIGS. 3 and 4, but may potentially be well suited for removal of salts such as $NH_4NO_3$, $NaNO_3$, $KNO_3$, $(NH_4)_2SO_4$, $NH_4Cl$ and $NH_4HCO_3$ from water.

As will be appreciated, the process 10 can easily be modified in order to treat water which does not require pH modification or metals removal and which already includes a dissolved salt which it is desired to remove. Such a desalination process would thus correspond to the process 10 but would omit the addition of a base to the aqueous effluent, as neutralisation of an acid is not required, and also does not require the metals sludge gravity settler 12.

Figure 5:
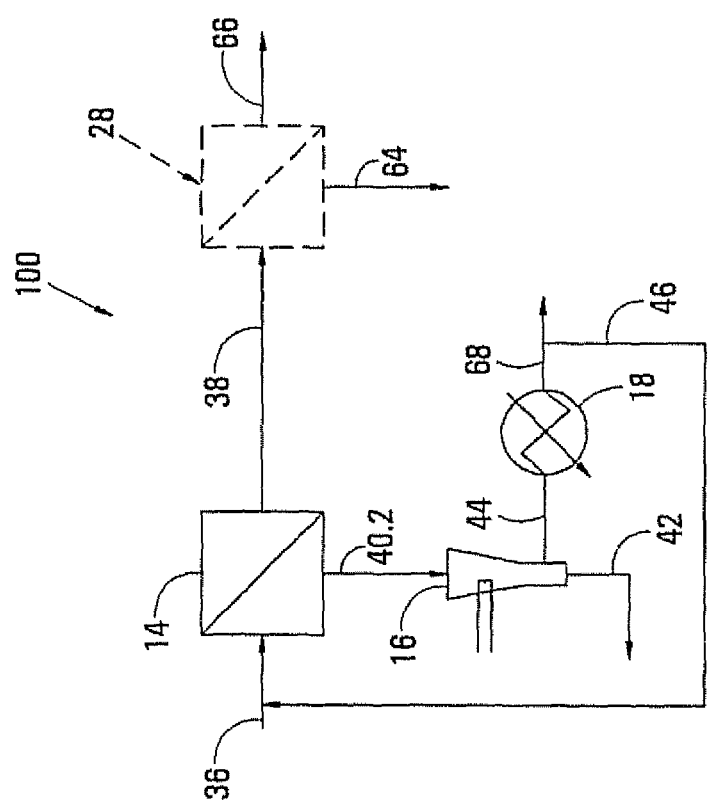
FIG. 5 shows another embodiment of a process in accordance with the invention to remove a salt from saline water.

Referring to FIG. 5 of the drawings, reference numeral 100 generally indicates another embodiment of a process in accordance with the invention to remove a salt from saline water. In FIG. 5, the same reference numerals have been used as are used in FIG. 1, to indicate the same or similar process features, unless otherwise indicated.

The process 100 thus includes a single membrane separation stage 14, which is an ultrafiltration membrane separation stage. The process 100 also includes the cooled salt precipitator 16, the heater 18 and the optional reverse osmosis stage 28.

The membrane separation stage 14 comprises a single stage, unlike the membrane separation stage 14 of the process 10.

For illustrative purposes, it is assumed that a neutralized, aqueous effluent stream flows at a rate of 10,000 l/h in the saline line 36, upstream of where the recycle line 46 joins the saline line 36. This aqueous effluent stream has a $Na_2SO_4$ concentration of 2 g/l. It is also assumed that the ultrafiltration membrane separation stage 14 has a water recovery of 90% and a $Na_2SO_4$ salt rejection of 100%.

The neutralized aqueous effluent, at a temperature $T_1$ which is ambient temperature, is thus fed to the membrane separation stage 14, at a pressure of about 5 bar, together with recycled brine from the recycle line 46. The ultrafiltration membrane separation stage 14 produces roughly 10,000 l/h of clean water which is withdrawn by means of the clean water line 38, and roughly 1,111 l/h of brine which is withdrawn by means of the brine line 40.2 and fed to the cooled salt precipitator 16. The brine in the brine line 40.1 has a $Na_2SO_4$ concentration of about 68 g/l. At an ambient temperature $T_1$ of say about 25° C., or a slightly higher temperature as a result of the recycle of heated brine by means of the recycle line 46, the aqueous effluent being fed to the membrane separation stage 14, and the brine in the brine line 40.2, are at all times above the saturation temperature for $Na_2SO_4$, as shown in FIG. 2.

In the cooled salt precipitator 16, the brine from the brine line 40.2 is cooled to a temperature $T_2$ of about 0° C. This is still above the freezing temperature of the brine from the membrane separation stage 14. At 0° C., $Na_2SO_4$ will precipitate from the brine, providing a brine with a saturated concentration of about 50 g/l of $Na_2SO_4$, which is withdrawn by means of the brine line 44. The precipitated $Na_2SO_4$ (roughly 20 kg/h) is withdrawn by means of the salt withdrawal line 42.

The brine in the brine line 44 is passed through the heater 18, at a flow rate of roughly 1,111 l/h. In the heater 18, the brine is heated to a temperature $T_3$ above about 25° C., say about 40° C. thereby to desaturate the brine with respect to the dissolved $Na_2SO_4$. The heated brine is then recycled by means of the recycle line 46 to the saline line 36, carrying with it about 55.55 kg of $Na_2SO_4$.

If desired, a small brine purge stream may be withdrawn by means of a purge line 68 to prevent build-up of impurities which do not precipitate in the cooled precipitator 16, in the process 100.

As is the case with the process 10, in the process 100, the clean water from the membrane separation stage 14 is treated in the optional reverse osmosis stage 28 to remove monovalent ions such as $Na^+$ and $Cl^-$, producing roughly 9,000 l/h of clean water which is withdrawn by means of the clean water line 66, and a brine stream of roughly 1,000 l/h which is withdrawn by means of the brine line 64. The water in the clean water line 66 is substantially free of $Na^+$ and $Cl^-$ ions, and other monovalent ions, whereas the brine in the brine line 64 will include monovalent ions such as dissolved $Na^+$ and $Cl^-$ ions.

The brine withdrawn from the optional reverse osmosis stage 18 may be subjected to evaporation, or to freeze desalination or freeze crystallisation, or to vacuum distillation. Similarly, if desired or necessary, the brine purge stream in the purge line 68 may be subjected to evaporation, or to freeze desalination or freeze crystallisation, or to vacuum distillation.

FIG. 6 shows an embodiment of a cooled salt precipitator 16 employing external heat exchangers 17.1 and 17.2 arranged in series for brine flow, using periodical reverse flow of brine to counteract salt and/or ice formation in the heat exchangers 17.1 and 17.2. The heat exchangers 17.1 and 17.2 receive a chilled cooling medium from a closed-loop refrigeration system or chiller 17.3 and cool warm brine, e.g. warm brine from the membrane separation stage 14. Cooling brine, e.g. the brine in the brine line 40.2 of FIG. 1, is inherently bound to cause the development of a salt and/or ice scale layer at a heat transfer surface or in a boundary layer of the brine being cooled. This will result in a reduced overall heat transfer coefficient for any heat exchanger used to cool the brine. The heat exchanger arrangement shown in FIG. 6 can advantageously be used to prevent or at least inhibit the formation of a salt and/or ice scale layer at heat transfer surfaces of the heat exchangers 17.1 and 17.2 used to cool the brine, or in a boundary layer of the brine being cooled. Warm brine from the brine line 40.2 is alternately fed first to the heat exchanger 17.1 and then to the heat exchanger 17.2 before entering the cooled salt precipitator 16, or first to the heat exchanger 17.2 and then to the heat exchanger 17.1 before entering the cooled salt precipitator 16, using valves 19.1, 19.2, 19.3 and 19.4. For feeding warm brine first to the heat exchanger 17.1 and then to the heat exchanger 17.2, valves 19.1 and 19.4 will be open and valves 19.2 and 19.3 will be closed. To reverse the flow of warm brine through the heat exchangers 17.1 and 17.2, i.e. to feed warm brine first to the heat exchanger 17.2 and then to the heat exchanger 17.1, valves 19.2 and 19.3 are opened and valves 19.1 and 19.4 are closed. Typically, the heat exchanger 17.1 or 17.2 first receiving the warm brine cools the brine form say 25° C. to say 10° C., and the second heat exchanger 17.1 or 17.2 cools the brine from say 10° C. to say 0° C. The worst scaling is expected to take place in the heat exchanger with the lower temperature duty (i.e. the heat exchanger having to cool the brine from say 10° C. to say 0° C.). If the flow of brine is reversed so that warm brine at say 25° C. is periodically fed to this colder heat exchanger, the salt and/or ice scale layer will dissolve and/or melt. Naturally, temperature sensors can be used to monitor the performance of the heat exchangers 17.1 and 17.2 and to trigger reversal of brine flow periodically when cooling becomes insufficient.

The invention claimed is:

1. A process to treat water that includes Ca and sulphate, the process comprising:
    adding a salt-forming base selected from the group consisting of $Na_2CO_3$, $NaHCO_3$, and mixtures thereof to the water to produce a solution enriched with dissolved sodium sulphate, to increase a pH of the water, and to form calcium carbonate;
    precipitating and removing the calcium carbonate from the solution;
    treating the solution at a temperature $T_1$ in a first membrane separation stage to provide clean water and a first brine, wherein a concentration of the dissolved sodium sulphate in the first brine is higher than a concentration of the dissolved sodium sulphate in the solution, and wherein the temperature $T_1$ is above a saturation temperature of the dissolved sodium sulphate in the solution;
    cooling the first brine to a temperature $T_2$ to precipitate a portion of the dissolved sodium sulphate from the first brine and separating the portion of the dissolved sodium sulphate that precipitated from the first brine thereby producing a second brine, the temperature $T_2$ being below the temperature $T_1$ but above a freezing temperature of the first brine;
    heating the second brine to a temperature above a saturation temperature of the dissolved sodium sulphate in the second brine; and
    treating the second brine at a temperature $T_3$ above the saturation temperature of the dissolved sodium sulphate in the second brine in a second membrane separation stage to provide clean water and a third brine,
    wherein the temperature $T_1$ and the temperature $T_2$ are both selected so that a solubility of the dissolved sodium sulphate in the solution at the temperature $T_1$ is at least 1.5 times a solubility of the dissolved sodium sulphate in the first brine at the temperature $T_2$.

2. The process as claimed in claim 1, in which the water being treated is acidic.

3. The process as claimed in claim 1, in which the temperature $T_1$ and the temperature $T_2$ are both selected so that the solubility of the dissolved sodium sulphate in the solution at the temperature $T_1$ is at least 2 times, preferably at least 2.5 times, more preferably at least 3 times, even more preferably at least 3.5 times the solubility of the dissolved sodium sulphate in the first brine at the temperature $T_2$.

4. The process as claimed in claim 1, in which $HNO_3$ and/or $H_2SO_4$ is present in the water being treated.

5. The process as claimed in claim 1, in which the water being treated includes metals in addition to the Ca and in which adding the salt-forming base selected from the group consisting of $Na_2CO_3$, $NaHCO_3$, and mixtures thereof to the water induces precipitation of one or more of the metals, the process further including removing the one or more precipitated metals from the solution prior to the solution being treated in the first membrane separation stage.

6. The process as claimed in claim 1, which includes recycling a portion of the second brine to the first membrane separation stage to increase the concentration of the dissolved sodium sulphate in the solution being treated in the first membrane separation stage.

7. The process as claimed in claim 6, in which the portion of the second brine being recycled to the first membrane separation stage is the second brine which has been heated to the temperature above the saturation temperature of the dissolved sodium sulphate in the second brine.

8. The process as claimed in claim 1, which includes:
    cooling the third brine to a temperature $T_4$ to precipitate a portion of the dissolved sodium sulphate from the third brine and separating the portion of the dissolved sodium sulphate that precipitated from the third brine thereby producing a fourth brine, the temperature $T_4$ being below the temperature $T_3$ but above a freezing temperature of the third brine;
    heating the fourth brine to a temperature above a saturation temperature of the dissolved sodium sulphate in the fourth brine; and
    treating the fourth brine at a temperature $T_5$ above the saturation temperature of the dissolved sodium sulphate in the fourth brine in a third membrane separation stage to provide clean water and a fifth brine.

9. The process as claimed in claim 8, in which the temperature $T_4$ is in a range of from 0° C. to 20° C.

10. The process as claimed in claim 1, in which the temperature $T_1$ is in a range of from 20° C. to 40° C. and the temperature $T_3$ is in a range of from 20° C. to 40° C.

11. The process as claimed in claim 1, in which the temperature $T_2$ is in a range of from 0° C. to 20° C.

12. The process as claimed in claim 1, which includes oxidising a metal or metals in the water prior to the solution being treated in the first membrane separation stage.

13. The process as claimed in claim 1, in which the first membrane separation stage and the second membrane separation stage are ultrafiltration membranes, the process including treating the clean water from the first membrane separation stage employing the ultrafiltration membranes and/or treating the clean water from the second membrane separation stage employing the ultrafiltration membranes in a reverse osmosis stage to remove monovalent ions.

* * * * *

UNITED STATES PATENT AND TRADEMARK OFFICE
CERTIFICATE OF CORRECTION

| | | |
|---|---|---|
| PATENT NO. | : 11,319,224 B2 | |
| APPLICATION NO. | : 16/099009 | |
| DATED | : May 3, 2022 | |
| INVENTOR(S) | : Tabani Mtombeni et al. | |

It is certified that error appears in the above-identified patent and that said Letters Patent is hereby corrected as shown below:

On the Title Page

Item (73) Assignee
Please correct "PHILLERT TRUST" to -- ROC Water Technologies (Pty) Ltd --

Signed and Sealed this
Thirtieth Day of August, 2022

Katherine Kelly Vidal
*Director of the United States Patent and Trademark Office*